(12) United States Patent
Backes et al.

(10) Patent No.: US 9,894,921 B2
(45) Date of Patent: Feb. 20, 2018

(54) USE OF CINNAMIC ACID DERIVATIVES CONTAINING NITROGEN AS FLAVOURING AGENTS

(71) Applicant: SYMRISE AG, Holzminden (DE)

(72) Inventors: Michael Backes, Holzminden (DE);
Jakob Peter Ley, Holzminden (DE);
Susanne Paetz, Höxter (DE);
Katharina Reichelt, Holzminden (DE)

(73) Assignee: SYMRISE AG, Holzminden (DE)

( * ) Notice: Subject to any disclaimer, the term of this patent is extended or adjusted under 35 U.S.C. 154(b) by 285 days.

(21) Appl. No.: 14/436,599

(22) PCT Filed: Dec. 2, 2013

(86) PCT No.: PCT/EP2013/075255
§ 371 (c)(1),
(2) Date: Apr. 17, 2015

(87) PCT Pub. No.: WO2014/083202
PCT Pub. Date: Jun. 5, 2014

(65) Prior Publication Data
US 2015/0272185 A1    Oct. 1, 2015

(30) Foreign Application Priority Data

Nov. 30, 2012   (EP) .................... 12194967

(51) Int. Cl.
| | | |
|---|---|---|
| A23L 1/22 | (2006.01) | |
| A23L 1/226 | (2006.01) | |
| A23L 27/00 | (2016.01) | |
| A23L 27/20 | (2016.01) | |
| A23L 27/23 | (2016.01) | |
| A23L 27/26 | (2016.01) | |

(52) U.S. Cl.
CPC ......... *A23L 1/22657* (2013.01); *A23L 27/204* (2016.08); *A23L 27/23* (2016.08); *A23L 27/26* (2016.08); *A23L 27/88* (2016.08)

(58) Field of Classification Search
CPC ...... A23L 1/22657; A23L 27/88; A23L 27/26; A23L 27/204; A23L 27/23
USPC .......................... 426/534, 538, 650
See application file for complete search history.

(56) References Cited

U.S. PATENT DOCUMENTS

| | | | | |
|---|---|---|---|---|
| 7,476,399 | B2 * | 1/2009 | Tachdjian | C07C 233/65 424/400 |
| 2004/0202619 | A1 * | 10/2004 | Dewis | C07C 233/09 424/48 |
| 2005/0197511 | A1 | 9/2005 | Hergenrother et al. | |

FOREIGN PATENT DOCUMENTS

| | | | |
|---|---|---|---|
| CN | 103619195 A | | 3/2014 |
| EP | 1323356 | * | 7/2003 |
| EP | 1323356 A2 | | 7/2003 |
| EP | 2529632 A1 | | 12/2012 |
| WO | WO-2013000673 A1 | | 1/2013 |

OTHER PUBLICATIONS

Third Office Action issued in parallel Chinese Application No. 201380062807.1, dated Jul. 19, 2017.
English Translation of Third Office Action issued in parallel Chinese Application No. 201380062807.1, dated Jul. 19, 2017.
Nobuji Nakatani et al: "Chemical constituents of peppers (piper spp.)and application to food preservation: Naturally occurring antioxidative compounds", Environmental Health Perspectives, U.S. Department of Health and Human Services, National Institute of Environmental Health Sciences, US, Bd. 67, 1986, pp. 135-142, XP000925839.
Dwivedi et al: "Synthesis and antihyperglycemic activity of novel N-acyl-2-arylethylamines and N-acyl-3-coumarylamines", Bioorganic & Medicinal Chemistry Letters, Pergamon, Elsevier Science, GB, Bd.18, Nr.7, 2008, pp. 2301-2305, XP022574950.
Michalet et al: "N-Caffeoylphenalkylamide derivatives as bacterial efflux pump Inhibitors", Bioorganic & Medicinal Chemistry Letters, Pergamon, Elsevier Science, GB, Bd.17, Nr. 6, 2007, pp. 1755-1758, XP005895405.
International Search Report and Written Opinion under Rule 43 PCT attached to the Search Report, PCT/EP2013/075255, no date.
Second Office Action issued in parallel Chinese Application No. 201380062807.1, dated Dec. 26, 2016.
English Translation of Second Office Action issued in parallel Chinese Application No. 201380062807.1, dated Dec. 26, 2016.

* cited by examiner

*Primary Examiner* — Leslie Wong

(74) *Attorney, Agent, or Firm* — Polsinelli PC

(57) ABSTRACT

Proposed is the use of cinnamic acid amide derivatives of formula (I)

in which $R^1$, $R^2$, $R^3$ and $R^4$, independently of one another, stand for hydrogen or a methoxy group, as a flavouring.

16 Claims, No Drawings

USE OF CINNAMIC ACID DERIVATIVES CONTAINING NITROGEN AS FLAVOURING AGENTS

CROSS REFERENCE TO RELATED APPLICATIONS

This application is a national stage application (under 35 U.S.C. § 371) of PCT/EP2013/075255, filed Dec. 2, 2013, which claims benefit of European Application No. 12194967.1, filed Nov. 30, 2012, the entire contents of which is fully incorporated herein by reference.

FIELD OF THE INVENTION

The invention is located in the field of flavouring agents and relates to the use of specific cinnamic acid amides as flavouring agents as well as aromatic blends and preparations for ingestion which contain these amides.

PRIOR ART

A constant requirement exists to find new flavouring agents, i.e. flavour-active compounds or compounds which can impart, modify and/or enhance taste impression. In particular, the requirement exists for such compounds which can impart the umami and/or kokumi taste impression or can generate, modify and/or enhance this taste impression on the taste buds. As part of the increased health awareness of consumers, compounds are additionally sought which can impart, modify and/or enhance a salty taste impression. As a whole, therefore, a particular requirement exists for savoury flavouring agents which can impart, modify and/or enhance all of the taste impressions, umami, kokumi and salty. Generally, flavouring agents are particularly preferred which can be found in natural, fresh or dried sources or those sources which are treated with preparation types which are usual for foodstuffs (e.g. evaporation or prevaporation, extraction, steaming, heating, roasting, cooking, frying, cooling, grinding, enzyme treatment, fermenting), said sources being of animal, plant, fungal or microbial origin, and in the ideal case can be isolated from these ("naturally occurring" agents).

A savoury taste impression is understood to be, in particular, the flavour, which is referred to as umami, of the amino acids glutamic acid and aspartic acid, and the nucleotides adenosine-5'-monophosphate, cytidine-5'-monophosphate, inosine-5'-monophosphate, guanosine-5'-monophosphate, in particular in the form of their monosodium salts, in particular also in mixtures of the aforementioned agents, wherein the umami flavour can also be caused by further compounds which are not listed here. The umami taste impression is often described with the terms "broth-like", "meaty", "mouth-filling" and "savoury" and is often seen in connection with the kokumi taste impression. Additionally, the umami taste impression often contributes to the saltiness in the scope of the overall taste perception, although saltiness is caused in particular by sodium ions, above all in the form of sodium chloride. The amino acids and nucleotides or salts referred to above have the disadvantage that a relatively high concentration of these agents must be used in order to impart a satisfactory umami or kokumi taste impression. Thus, for example, sodium glutamate must regularly be present in a concentration of 0.02 to 0.5% by weight with regard to the total weight of the foodstuff in order to generate the desired taste impression. The nucleotides referred to above are additionally only each slightly effective alone and can therefore often only impart a satisfactory umami taste impression together with sodium glutamate.

Only in the last few years have a few non-naturally occurring compounds having a substantially more potent effect which is similar to umami been described, for example in the specifications EP 1989944 A1, WO 2008 046895 A1, EP 2168442 A2 (all Symrise), US 2004 0202760 A1, US 2006 057268 and US 2007 0134389 (all IFF). These compounds often supposedly have a 10 to 10000 time stronger flavouring effect as a mono sodium glutamate.

Furthermore, it has been achieved by molecular biological methods, to identify the substantial receptor of the human which is responsible for the glutamate and umami flavour. Based on these findings, in WO 2003 004992 A2 (NIH) and WO 2003 001876 A2 (Senomyx), measurement methods were proposed in order to identify new umami flavouring agents, which were possibly active in terms of the senses. Thus in the publication US 2005 084506 A (Senomyx) a few potential activators of the umami receptor are described in the form of non-naturally occurring amides. From the publications referred to, for example, a few non-naturally occurring cinnamic amides of aromatic amines are described, which can supposedly activate the externally-expressed, human, potential umami receptor.

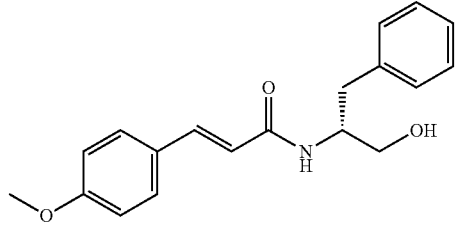

Example 81 from US 2005/084506

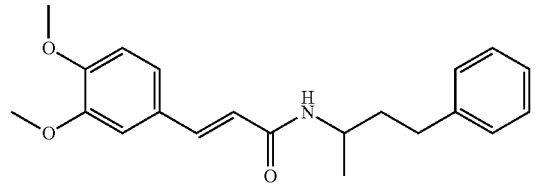

Example D16 from US 2005/084506

The compounds referred to above are non-naturally occurring compounds. Generally—as also in the scope of the present invention—however, naturally occurring compounds are preferred compared to synthetic or non-naturally occurring compounds. Naturally occurring amides which impart or enhance a potent Umami taste impression of the structural types referred to above, however, have not been described previously in prior art.

In publication EP 1323356 A2 (Symrise), indeed the use of certain naturally occurring cinnamic acid amides of aromatic amines as aromatic substances is described, however, with respect to this, this specification only discloses that these compounds (in the concentrations described therein) are experienced as spicy or warming, which means they impart a certain chemesthetic stimulation. Any (primary) taste impressions which are imparted by the compounds described in this document are, however, not described therein.

Consequently, the primary object of the present invention was to provide new uses for known compounds as flavourings to impart, modify and/or enhance at least one of the taste impressions umami, kokumi and salty. Particularly preferably, uses were to be specified wherein compounds are used which have an at least 10 time stronger flavouring effect than sodium glutamate and therein impart a particularly clean taste impression, i.e. a taste impression which is not falsified or influenced by further flavours. Furthermore, it was necessary to provide new preparations (that were ready for use or consumption) and semi-finished products for the production thereof, which served for nutrition or enjoyment. Sodium glutamate or preparations which are low in or free of salt and sugar are therein particularly preferred.

DESCRIPTION OF THE INVENTION

Subject matter of the invention is the use of cinnamic acid amide derivatives of formula (I)

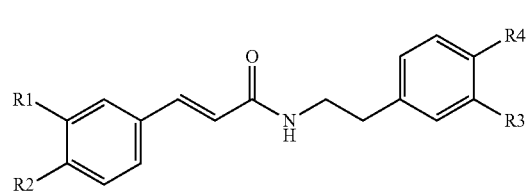

(I)

In which $R^1$, $R^2$, $R^3$ and $R^4$, independently of one another, stand for hydrogen or a methoxy group as flavourings.

Surprisingly it was found that the comprehensive object depicted above is solved to the full extent by the compounds of formula (I).

In particular, in view of the publication EP 1323356 A2 which has already been explained in the introduction, it was surprising that the compounds to be used according to the invention of formula (I) impart or generate only an underlying chemesthetic stimulation at higher concentrations, therefore, however, can impart, modify and/or enhance a umami taste impression, in particular, in foodstuffs which are highly reduced in or free of sodium glutamate as well as in food stuffs having a reduced sodium chloride content (for example in savoury foodstuffs such as tomato soups, chicken soups, snack foods, ready-made pizza, crisps and popcorn) both in the initial flavour (impact) and in the longer-lasting flavour perception. The agents enable, in particular, the adjustment of a flavour experience which is experienced as particularly pleasant and which is assessed as preferred in many cases even compared to sodium glutamate, because it is free of further underlying flavours.

Cinnamic Acid Amide Derivatives

The cinnamic acid amide derivatives to be used according to the invention represent modifications of known agents which are obtainable according to appropriate methods of organic chemistry. An overview of different cinnamic acid amides of aromatic amines can be found, for example, in Chapter 3 of the review article by Bassard, et al. in Phytochemistry 2010, 71, (16), 1808-1824. In Table A, a series of prominent examples is reproduced which are not according to the invention but have a structural similarity.

TABLE A

Known cinnamic acid amides of prior art and the sources thereof

| Compound | Structure | Source | Publication |
|---|---|---|---|
| Rubemamine | | *Zanthoxylum rubescens* (traces) *Chenopodium album* (5-10 mg/kg) | S. K. Adesina and J. Reisch, *Phytochemistry* 1989, 28 (3), 839-842 Cutillo, F.; D'Abrosca, B.; DellaGreca, M.; Di Marino, C.; Golino, A.; Previtera, L.; Zarrelli, A. *Phytochemistry* 2003, 64, 1381-1387 |
| Rubemamide | | *Zanthoxylum rubescens* | S. K. Adesina and J. Reisch, *Phytochemistry* 1989, 28 (3), 839-842 |
| Rubescenamine | | *Zanthoxylum rubescens* | S. K. Adesina, *Planta Medica* 1989, 55 (3), 324-326 |
| Rubescenamide | | *Zanthoxylum rubescens* | S. K. Adesina, *Planta Medica* 1989, 55 (3), 324-326 |

TABLE A-continued

Known cinnamic acid amides of prior art and the sources thereof

| Compound | Structure | Source | Publication |
|---|---|---|---|
| Zanthosine | | Zanthoxylum rubescens | S. K. Adesina, *Planta Medica* 1989, 55 (3), 324-326 |
| Zanthosinamide | | Zanthoxylum rubescens | S. K. Adesina, O. A. Olatunji, D. Bergenthal and J. Reisch, *Pharmazie* 1988, 43 (7), 517-518 |
| Dioxamide | | Zanthoxylum rubescens | S. K. Adesina and J. Reisch, *Phytochemistry* 1989, 28 (3), 839-842 |
| Dioxamine | | Zanthoxylum rubescens | S. K. Adesina and J. Reisch, *Phytochemistry* 1989, 28 (3), 839-842 |
| Zanthomamine | | Zanthoxylum rubescens | S. K. Adesina and J. Reisch, *Phytochemistry* 1989, 28 (3), 839-842 |
| Zanthomamide | | Zanthoxylum rubescens | S. K. Adesina and J. Reisch, *Phytochemistry* 1989, 28 (3), 839-842 |

The cinnamic acid amide derivatives can be produced analogously to the agents referred to above.

Among the compounds to be used according to the invention, those in which, in formula (I), at least one of the groups $R^1$, $R^2$, $R^3$ and $R^4$ in formula (I) stands for hydrogen, have been proved particularly advantageous. Particularly preferred is the use of cinnamic acid amide derivatives in which, in formula (I), $R^1$, $R^2$ and $R^4$ stand for a methoxy group and $R^3$ for hydrogen. These agents are distinguished by a particularly neutral taste impression, i.e. it lacks all further taste sensation which could falsify the desired taste impression, in particular umami, kokumi and/or salty.

The cinnamic acid amid derivatives according to the invention can be mixed with rubemamine and the derivatives thereof. In the sense of the present invention, therefore mixtures of the agents of formula (I), in particular the preferred embodiments defined above, are disclosed with any of the agents which are selected from the group which is formed of rubemamine, rubemamide, rubescenamine, rubescenamide, zanthosine, zanthosinamide, dioxamide, dioxamine, zanthomamine and zanthomamide as well as mixtures thereof. Particularly preferred therein is the combination (a1) of a material of formula (I) in which $R^1$, $R^2$ and $R^4$ stand for a methoxy group and $R^3$ for hydrogen, with (b1) rubemamine or rubescenamine or mixtures thereof, wherein the input ratio of the agents can amount to a1:(b1+b2) =approximately 10:90 to approximately 90:10, preferably approximately 25:75 to approximately 75:25 and in particular approximately 40:60 to approximately 60:40.

Aromatic Blends

A further subject matter of the present invention relates to aromatic preparations, containing
(a) at least one compound of formula (I) and
(b) at least one further flavouring agent.

The flavouring agents which form the components (b) and are thus, of course, different from the components (a), are preferably selected such that they also impart, taken alone, at least one of the taste impressions umami, kokumi or salty and are, in particular, in the position to mask unpleasant taste impressions such as bitter, metallic, chalky, sour or astringent or to enhance pleasant taste impressions (e.g. sweet). Also, for the aromatic blends it applies mutatis-mutandis, that the compounds of formula (I) can be mixed with rubemamine and derivatives thereof in the same way as is explained above.

Flavouring agents which form the group (b) are, for example, selected from the group consisting of monosodium glutamate, free glutamic acid, nucleotides or pharmaceutically acceptable salts thereof, strombines, theogallins, pyridine betaine compounds, glutamic acid glycosides, malic acid glycosides, glutathione derivatives, lactisoles and alkylpyridine (preferably alkypyridines such as are described in WO 2009 122318 A1 und WO 2009 1223319 A1), in particular 2-hexyl-, 2-heptyl und 2-octylpyridine, (2E,6Z)—N-cyclopropylnona-2,6-dienamide, (2E,6Z)—N-ethylnona-2,6-dienamide, N-[(2E)-3,7- dimethylocta-2,6-dienyl]cyclopropane carboxamide, N'-[(2-methoxy-4-methyl-phenyl)methyl]-N-[2-(5-methyl -2-pyridyl)ethyl]-oxamide, N'-[(2, 4-dimethoxyphenyl)methyl]-N-[2-(2-pyridyl)ethyl] oxamide, N'-[(2-methoxy-4-methyl-phenyl)methyl]-N-[2-(2-pyridyl)ethyl]oxamide, N-(1-propylbutyl) -1,3-benzodioxole-5-carboxamide, 1-(2-hydroxy-4-isobutoxy-phenyl)-3-(2-pyridyl)propan-1-one and 1-(2-hydroxy-4-methoxy-phenyl)-3-(2-pyridyl)propan-1-one.

Generally the or two, three, several or all of the further flavouring agents to impart, modify and/or enhance one, two or all of the taste impressions umami, kokumi and salty is or are preferably naturally-occurring compounds, particularly preferably compounds selected from the group consisting of: monosodium glutamate, free glutamic acid, nucleotides (e.g. adenosine-5'-monophosphate, cytidine-5'-monophosphate, Inosine-5'-monophosphate, guanosine-5'-monophosphate), or the pharmaceutically acceptable salts thereof, strombines as described in WO 2010 100589 A1, theogallins as described in JP 2007 110988 A, pyridine betaine compounds as described in EP 1291342 B1, glutamic acid glycosides as described in WO 2002 087361 A1, malic acid glycosides as described in WO 2006 003107 A1, glutathione derivatives as described in EP 0181421 or WO 2007 042273 A1, lactisoles, hydroxyflavanones (e.g. eriodictyol, homoeriodictyol or sodium salts thereof), in particular according to EP 1258200 B1, hesperetin according to EP 1909599 A1, phloretin according to EP 1972203 B1 or EP 1998636 B1, hydroxyflavanes according to US 2010 292175 AA, 4-hydroxychalcone according to EP 1972203 B1, extracts based on *Hydrangea dulcis* according to EP 2298084 A2, or *Rubus* ssp.; mixtures of whey proteins with lecithins, yeast extracts, vegetable hydrolysates, powdered vegetables (e.g. onion powder, tomato powder), plant extracts (e.g. from lovage or mushrooms such as shiitake), seaweed and mineral salt mixtures, in particular mineral salt mixtures according to US 2009 214728 AA.

Synthetic flavouring agents, preferably to be combined with compounds to be used according to the invention of formula (I) or mixtures thereof to impart, modify and/or enhance one, two or all of the taste impressions umami, kokumi and salty are preferably selected from the chemical structures which are described in publications US 2004 0202619 AA, US 2004 0202760 AA, US 2006 0057268 AA und US 2006 0068071 AA, in particular (2E,6Z)—N-cyclopropylnona-2,6-dienamide (FEMA 4087; Flavis 16.093), 2E,6Z)—N-ethylnona-2,6-dienamide (FEMA 4113; Flavis 16.094) und N-[(2E)-3,7-dimethylocta-2,6-dienyl]cyclopropane carboxamide (FEMA 4267; Flavis 16.095), the chemical structures as are described in US2005 0084506, in particular N'-[(2-methoxy-4-methyl-phenyl)methyl]-N-[2-(5-methyl-2-pyridyl)ethyl]oxamide (FEMA 4234; Flavis 16.190), N'-[(2,4-dimethoxyphenyl)methyl]-N-[2-(2-pyridyl)ethyl]oxamide (FEMA 4233; Flavis 16.099), N'-[(2-methoxy-4-methyl-phenyl)methyl]-N-[2-(2-pyridyl)ethyl] oxamide (FEMA 4231; Flavis 16.101), N-(1-propylbutyl)-1,3-benzodioxole-5-carboxamide (FEMA 4232; Flavis 16.098), and the chemical structures as are described in WO 2011 004016 A2, in particular 1-(2-hydroxy-4-isobutoxy-phenyl)-3-(2-pyridyl)propan-1-one (FEMA 4722) und 1-(2-hydroxy-4-methoxy-phenyl)-3-(2-pyridyl)propan-1-one (FEMA 4723).

In a preferred embodiment of the present invention, the aromatic blends can also contain one or more sweet-enhancing agents as components (b), such as, for example, one or more compounds according to WO 2007014879 A1, WO 2007 107596 A1, US 2010 292175 AA and EP 1955601 B1, in particular hesperetin, 3,7'-dihydroxy-4'-methoxyflavane and/or phloretin. Hereby, advantageously, an enhancing and a deepening as well as a rounding of the taste profile is achieved, in particular in preparations and semi-finished products according to the invention with a savoury and/or salty taste. The aromatic blends are preferably used in these cases such that the total proportion of hesperetin, 3,7'-dihydroxy-4'-methoxyflavane and/or phloretin in such compositions or preparations ranges from 1 to 400 ppm respectively, preferably from 5 to 200 ppm, with regard to the overall weight of the preparation or semi-finished product.

Fundamentally, the aromatic blends according to the invention can contain the compounds of formula (I), with regard to the overall weight, in quantities of approximately 0.0001 to approximately 95, preferably approximately 0.1 to approximately 80, and in particular from approximately 1 to 50% by weight.

Preparations for Ingestion

A further subject matter of the present invention comprises preparations for ingestion containing
(a) at least one compound of formula (I) and
(b) at least one further component suitable for consumption selected from the group which is formed of carriers, aromatic substances, fats and oils, emulsifiers and antioxidants.

It also applies mutatis-mutandis for the produced preparations that the compounds of formula (I) can be mixed in the same way as explained above with rubemamine and derivatives thereof.

The oral preparations according to the invention represent preparations which are ready for use or consumption (which serve for nutrition or enjoyment). These are regularly products which are determined to be introduced into the human oral cavity, to remain there for a determined time and finally either to be consumed (e.g. food products which are ready for consumption, also see further below) or removed again from the oral cavity (e.g. chewing gum). These products therein include all agents or products which are determined, in a processed, partially processed or unprocessed state, to be ingested by humans. These also include agents which are added to foodstuffs during their production, processing or preparation and are provided to be introduced into the human oral cavity.

Food Products

In the scope of the present text, "food products or foodstuffs" are understood in particular to be substances which are determined, in an unchanged, prepared or processed state, to be swallowed by humans and then digested; in this respect coatings, films or other casings are also to be understood as foodstuffs, which are determined to be swallowed or for which swallowing is anticipated. Also certain products which are removed again from the oral cavity (e.g. chewing gum) are to be understood to be foodstuffs in the scope of the present text, as in their case it must not be excluded that they are at least partially swallowed.

Herein a foodstuff which is ready for consumption is understood to be a foodstuff which is already completely assembled with regard to the substances which are significant for flavour. The term "foodstuff which is ready for consumption" also includes drinks as well as solid or semi-solid foodstuffs which are ready for consumption. So-called frozen products are referred to as examples, which must be defrosted before consumption and heated to consumption temperature. Also products such as yoghurt or ice cream, but also chewing gum or solid caramels are included in the foodstuffs which are ready for consumption.

Semi-Finished Products

The term of oral preparation also comprises, in the sense of the invention, semi-finished products for the production of a preparation serving for nutrition or enjoyment. By semi-finished products, in connection with the present invention, is understood a product which is unsuitable for use as a foodstuff which is ready for consumption due to its very high content of flavouring agents and aromatic substances. Only by mixing with at least one further component (i.e. by reducing the concentration of the relevant flavouring agent and aromatic substance) and if necessary further process steps (e.g. heating, freezing) is the semi-finished product transferred into a foodstuff that is ready for consumption. Here, packet soups, extracts for baking and custard powder are referred to as an example of semi-finished products.

The food products or semi-finished products can contain the compounds of formula (I), with regard to the total weight, ranging from 5 ppm to 100,000 ppm, preferably ranging from 10 ppm to 10,000 ppm, in particular ranging from 15 ppm to 500 ppm.

A. Carriers

A range of preparations or semi-finished products according to the invention (as is described above) is particularly preferred. Thus, for example, preparations or semi-finished products according to the invention are, according to a preferred embodiment, spray-dried preparations or semi-finished products which comprise (among other things) solid carriers as further components which are suitable for consumption.

Preparations or semi-finished products according to the invention are preferred according to the invention which comprise one or more solid carriers which are suitable for consumption, wherein, with regard to the dry mass of the preparation or semi-finished product, the weight ratio of the total quantity of compounds of formula (I) to the total quantity of solid carriers which are suitable for consumption preferably ranges from 1:10 to 1:100000, preferably ranges from 1:50 (preferably 1:100) to 1:20000, particularly preferably ranges from 1:100 (preferably 1:1000) to 1:5000.

Furthermore, it is preferred if therein the total quantity of compounds of formula (I) and solid carriers which are suitable for consumption, with regard to total weight of the preparation or semi-finished product, ranges from 70 to 100% by weight, preferably ranges from 85 to 100% by weight.

Advantageous carriers are silicon dioxide (silicic acid, silica gel), carbohydrates and/or carbohydrate polymers (polysaccharides), cyclodextrins, starches, decomposed starches (starch hydrolysates), chemically or physically modified starches, modified celluloses, gum arabic, ghatti gum, tragacanth, karaya gum, carrageenan, guar gum, carob gum, alginates, pectin, inulin or xanthan gum. Preferred starch hydrolysates are maltodextrins and dextrins.

Particularly preferred carriers according to the invention are silicon dioxide, gum arabic and maltodextrins, wherein here in turn maltodextrins with DE values ranging from 5 to 20 are particularly preferred. It is therein irrelevant which plant originally supplied the starch for the production of the starch hydrolysates. However, corn-based starches as well as starches made from tapioca, rice, wheat or potatoes are particularly suitable and readily available. The carriers can therein also function as flow agents, such as, for example, silicon dioxide.

The preparations or semi-finished products according to the invention, which comprise, besides the compounds to be used according to the invention of formula (I) or the mixtures defined above, a or several solid carriers, can, for example, be produced by mechanical mixing processes, wherein at the same time also a granulation of the particles can occur, or by means of spray drying. Correspondingly, compositions or semi-finished products are particularly preferred which comprise solid carriers and are produced by means of spray drying; with regard to the spray drying, U.S. Pat. Nos. 3,159,585, 3,971,852, 4,532,145 or U.S. Pat. No. 5,124,162 is referred to.

Preferred preparations and semi-finished products according to the invention, comprising carriers, which were produced by means of spray drying, have an average particle size ranging from 30 to 300 μm and a residual moisture of less than or equal to 5% by weight.

B. Aromatic Substance

The oral preparations can contain one or more aromas as further components. Such an aromatic composition comprises, for the purposes of the present invention, at least one volatile aromatic substance (compounds of formula (I) are not meant here). The at least one volatile aromatic substance is therein preferably a component which is effective in terms of the senses having a vapour pressure of greater than or equal to 0.01 Pa at 25° C., preferably a vapour pressure of greater than or equal to 0.025 Pa at 25° C. A large portion of the volatile aromatic substance has a vapour pressure of greater than or equal to 1 Pa at 25° C. These aromatic substances are considered as particularly preferred for use in preparations, semi-finished products or flavouring mixtures according to the invention.

Suitable aromatics compositions preferably contain synthetic, natural or nature-identical aromatic substances, flavouring agents and aromatic agents, process flavourings, smoke flavours or other flavour-giving preparations (e.g. protein[partial]hydrolysates, barbecue flavours, plant extracts, spices, spice preparations, vegetable and/or vegetable preparations) as well as, if necessary, suitable auxiliary materials and carriers. In particular, here, such aromatic compositions or the components thereof are suitable which cause a roasted, meaty (in particular chicken, fish, seafood, beef, pork, lamb, mutton, goat), vegetable (in particular tomato, onion, garlic, celery, leek, mushroom, aubergine, seaweed), a savoury (in particular black and white pepper, chilli, paprika, cardamom, nutmeg, pimento, mustard and mustard products), fried, yeasty, boiled, fatty, salty and/or spicy aroma impression and thus can enhance the savoury impression. As a rule, the aromatic compositions contain more than one of the ingredients referred to.

Modulating aromatic substances and flavouring agents are preferably selected from the group consisting of adenosine 5'-monophosphate, cytidine 5'-monophosphate, inosin-5'-monophosphate, and pharmaceutically acceptable salts thereof; lactisoles; 2,4-dihydroxybenzoic acid; 3-hydroxybenzoic acid; sodium salts, preferably sodium chloride, sodium lactate, sodium citrate, sodium acetate, sodium gluconate; hydroxyflavanones, such as, for example eriodictyol, homoeriodictyol, and sodium salts thereof; hydroxybenzoic acid amides, such as, for example, 2,4-dihydroxybenzoic acid vanillylamide, 2, 4-dihydroxybenzoic acid-N-(4-hydroxy-3-methoxybenzyl)amide, 2,4,6-trihydroxybenzoic acid-N-(4-hydroxy-3-methoxybenzyl) amide, 2-hydroxybenzoic acid-N-4-(hydroxy-3-methoxybenzyl)amide, 4-hydroxybenzoic acid-N-(4-hydroxy-3-methoxybenzyl)-amide, 2,4-dihydroxybenzoic acid-N-(4-hydroxy-3-methoxybenzyl)amide monosodium salt, 2,4-dihydroxybenzoic acid-N-2-(4-hydroxy-3-methoxyphenyl)-ethylamide, 2,4-dihydroxybenzoic acid-N-(4-hydroxy-3-ethoxybenzyl)amide, 2,4-dihydroxybenzoic acid-N-(3,4-dihydroxybenzyl)amide und 2-hydroxy-5-methoxy-N-[2-(4-hydroxy-3-methoxyphenyl)ethyl]amide; 4-hydroxy benzoic acid vanillylamide; hydroxydeoxybenzoins, such as, for example, 2-(4-hydroxy-3-methoxyphenyl)-1-(2,4,6-trihydroxyphenyl)ethanone, 1-(2,4-dihydroxyphenyl)-2-(4-hydroxy-3-methoxyphenyl)ethanone, 1-(2-hydroxy-4-methoxyphenyl)-2-(4-hydroxy-3-methoxyphenyl)ethanone; hydroxyphenyl alkane diones, such as, for example, gingerdion-[2], gingerdion-[3], gingerdion-[4], dehydrogingerdion-[2], dehydrogingerdion-[3], dehydrogingerdion-[4]); diacetyl trimers; γ-aminobutyric acids and divanillins; bicyclo[4.1.0]heptane-7-carboxylic acid amides; cyclopropanecarboxylic acid (3-methylcyclohexyl)amide, aromatic neomenthylamides; geranylamine derivatives of the oxalic acid as well as neomenthyl derivatives.

The aromatic compositions can also be used in the form of process flavourings (Maillard products) and/or extracts or essential oils from plants or plant parts or fractions thereof.

C. Fats and Oils

According to a further preferred embodiment of the present invention, the oral preparations can contain fats and oils and are then present as a water-in-oil (W/O) emulsion.

Besides the compound(s) to be used according to the invention of formula (I), such an emulsion comprises water, an oil phase, one or more (consumable) W/O emulsifiers, if necessary one or more antioxidants and if necessary one or more agents to enhance an antioxidant effect. Therein the statements above apply accordingly with respect to preferred compounds of formula (I) and mixtures thereof.

The oil phase of such a W/O emulsion according to the invention preferably consists of or comprises a fatty oil and/or an aromatic composition (preferably an aromatic composition as described above).

For example, cooking oils, in particular vegetable oils, are suitable as fatty oils. Suitable fatty oils are, for example, borage oil, thistle oil, peanut oil, hazelnut oil, coconut oil, pumpkin seed oil, linseed oil, corn oil, macadamia nut oil, almond oil, olive oil, palm kernel oil, pecan oil, pistachio oil, rapeseed oil, rice germ oil, sesame oil, soybean oil, sunflower oil, walnut oil or wheat germ oil, or available fractions thereof. Liquid neutral esters based on medium-chain fatty acids and glycerine can be used, such as, for example, Miglyols (e.g. Miglyol 810, Miglyol 812). Sunflower oil, palm kernel oil and rapeseed oil are preferred. More preferably fractioned coconut oils are used which have mainly fatty acid residues having 6 to 8 C atoms. These are distinguished by their flavour neutrality as well as by their good oxidation stability.

The W/O emulsions according to the invention are particularly suitable for application to foodstuff surfaces, wherein the foodstuffs preferably have a water content of at most 10% by weight, preferably at most 5% by weight. In a preferred embodiment, the W/O emulsion according to the invention has a sufficiently low viscosity at application temperature, such that an application of W/O emulsion is possible by means of spraying. Preferred foodstuffs, to the surfaces of which a W/O emulsion according to the invention can be applied, are, for example, crackers, crisps (e.g. based on potatoes, corn, cereals or bread), extruded snack items (snacks, e.g. "Flips") or lye rolls (e.g. pretzel sticks). W/O emulsions according to the invention are regularly applied to the foodstuff surface in a quantity of 0.5 to 6% by weight, with respect to the total weight of the foodstuff.

D. W/O Emulsifiers

To stabilise the fat or oil/water mixtures, W/O emulsifiers which are approved for foodstuffs are required. Preferably, the consumable W/O emulsifier is selected from the group consisting of lecithin (E 322), mono- und diglycerides of cooking fatty acids (E 471), acetic acid monoglycerides (E 472a), lactic acid monoglycerides (E 472b), citric acid monoglycerides (E 472c), tartaric acid monoglycerides (E 472d), diacetyl tartaric acid monoglycerides (E 472e), sorbitan monostearate (E 491).

E. Antioxidants

The preparations can furthermore also contain antioxidants. Suitable antioxidants and agents which can enhance the antioxidant effect are, in particular, the naturally occurring tocopherols and derivatives thereof, tocotrienols, flavonoids, ascorbic acid and its salts, alpha-hydroxy acids (e.g. citric acid, lactic acid, malic acid, tartaric acid) and Na, K and Ca salts thereof, ingredients isolated from plants, extracts or fractions thereof, for example from tea, green tea, seaweed, grape seeds, wheat germ, rosemary, oregano, flavonoids, quercetin, phenolic benzylamines. Furthermore, propyl gallate, octyl gallate, dodecyl gallate, butylated hydroxyanisole (BHA), butylated hydroxytoluene (BHT), lecithins, mono- and diglycerides from cooking fatty acids esterified with citric acid, orthophosphates and Na, K and Ca salts of the monophosphoric acid and ascorbyl palmitate are suitable as antioxidants.

F. Further Auxiliary Materials and Additives

Further components of a preparation according to the invention which is ready for consumption, serving for nutrition or enjoyment, or a semi-finished product according to the invention can be usual basic materials, auxiliary materials and additives for food products and luxury foods, for example water, mixtures of fresh or processed, vegetable or animal basic or raw materials (e.g. raw, fried, dried, fermented, smoked and/or cooked meat, bone, cartilage, fish, vegetables, herbs, nuts, vegetable juices or pastes or mixtures thereof), digestible or indigestible carbohydrates (e.g. sucrose, maltose, fructose, glucose, dextrins, amylose, amylopectin, inulin, xylans, cellulose, tagatose), sugar alcohols (e.g. sorbitol, erythritol), natural or hardened fats (e.g. tallow, lard, palm oil, coconut oil, hardened vegetable fats), oils (e.g. sunflower oil, peanut oil, corn oil, olive oil, fish oil, soybean oil, sesame oil), fatty acids or salts thereof (e.g. potassium stearate), proteinogenic or nonproteinogenic amino acids and related compounds (e.g. γ-aminobutyric acid, taurine), peptides (e.g. glutathione), native or processed proteins (e.g. gelatines), enzymes (e.g. peptidases), nucleic acids, nucleotides, flavour modifiers for unpleasant taste impressions, further taste modulators for further, as a rule not unpleasant taste impressions, other flavour-modifying agents (also see above for this purpose; e.g. inositol phosphate, nucleotides such as guanosine monophosphate, adenosine monophosphate or other agents such as sodium glutamate or 2-phenoxy propionic acid), emulsifiers (e.g. lecithins, diacylglycerols, gum arabic), stabilisers (e.g. carrageenan, alginate), preservatives (e.g. benzoic acid and salts thereof, sorbic acid and salts thereof), antioxidants (e.g. tocopherol, ascorbic acid), chelating agents (e.g. citric acid), organic or inorganic acidifiers (e.g. acetic acid, phosphoric acid), additional bitter substances (e.g. quinine, caffeine, limonin, amarogentin, humulones, lupolones, catechins, tannins), agents which prevent enzymatic browning (e.g. sulphite, ascorbic acid), essential oils, plant extracts, natural or synthetic dyes or pigments (e.g. carotenoids, flavonoids, anthocyanins, chlorophyll und derivatives thereof), spices, trigeminally effective agents or plant extracts containing such trigeminally effective agents, synthetic, natural or nature-identical flavouring agents or aromatic substances as well as odour modifiers.

Preferably, preparations or semi-finished products according to the invention additionally contain an aromatic composition (as is described above) in order to round or refine the flavour and/or the odour.

G. Sodium Glutamate, Sugar and Salt

Particularly preferably, the compounds to be used according to the invention of formula (I) as well as the aromatic preparations obtainable therefrom are used in such food products or semi-finished products which, on the one hand
(a) either have a reduced content of sodium glutamate or are completely free thereof, and, on the other hand
(b) either have a reduced content of sugar and/or salt or are likewise completely free thereof.

Accordingly, the preparations or semi-finished products according to the invention which are free of sodium glutamate or the preparations or semi-finished products which are reduced in sodium glutamate and reduced in sugar and/or salt or are free of sugar and/or salt are particularly preferred.

The term "reduced in sodium glutamate" therein means that the preparation or semi-finished product according to the invention contains clearly less sodium glutamate than is contained in the usual preparation or semi-finished product; the sodium glutamate content therein lies at 5 to <100% by weight, preferably 10 to 50% by weight, particularly preferably 20 to 50% by weight below the sodium glutamate content of the usual preparation or semi-finished product. Provided that, besides one or more compounds of formula (I), sodium glutamate is also present in a preparation or semi-finished product according to the invention, the weight ratio of the total quantity of compounds of formula (I) to sodium glutamate preferably ranges from 1:1 to 1:200. This definition also applies mutatis-mutandis for preparations which are reduced in sugar or salt.

Therefore, such preparations or semi-finished products according to the invention which are reduced in sodium glutamate are particularly preferred, wherein the weight ratio of the total quantity of compounds of formula (I) to the total quantity of sodium glutamate, with regard to the dry mass of the preparation or semi-finished product, ranges from 1:1 to 1:200. Here, the preferred embodiment also applies analogously for the preparations which are reduced in sugar or salt.

Such preparations which are reduced in sodium glutamate are particularly preferred, in which
the total quantity of sodium glutamate is not sufficient to impart a (satisfactory) umami taste impression in a comparable preparation which does not comprise a compound of formula (I), but is otherwise composed identically (normal preparations which are reduced in sodium glutamate), and the total quantity of compounds of formula (I) is sufficient to impart to the preparation a (satisfactory) umami taste impression as well as optionally a (satisfactory) kokumi and/or a (satisfactory) salty taste impression.

The preparations according to the inventions serving for nutrition or enjoyment and semi-finished products according to the invention are preferably selected from the group consisting of
baked goods (e.g. bread, dry biscuits, cake, other pastries),
drinks (e.g. vegetable juices, vegetable juice preparations),
instant drinks (e.g. instant vegetable drinks),
meat products (e.g. ham, fresh sausage or raw sausage preparations, spiced or marinated fresh or salt meat products),
spiced or marinated fish products (e.g. Surimi),
eggs or egg products (dried egg, egg white, egg yolk),
cereal products (e.g. pre-cooked instant rice products, rice flour products, millet and sorghum products, raw or pre-cooked noodle and pasta products),
milk products (e.g. cream cheese, soft cheese, hard cheese, milk drinks, whey, butter, products containing completely or partially hydrolysed milk protein),
products made from soya protein and other fractions of soya beans (e.g. soya milk and products produced therefrom, preparations containing soya lecithin, fermented products such as tofu or tempeh or products produced therefrom, soya sauce),
vegetable preparations (e.g. ketchup, sauces, dried vegetables, frozen vegetables, pre-cooked vegetables, vegetables picked in vinegar, vegetable concentrates or pastes, boiled vegetables, potato preparations),
snack products (e.g. baked or fried potato crisps or potato dough products, bread dough products, extrudates based on corn, rice or peanuts),
products based on fat and oil or emulsions of the same (e.g. mayonnaise, spreads, tartar sauce, dressings, seasoning preparations),
other instant meals and soups (e.g. dried soups, instant soups, pre-cooked soups), sauces (instant sauces, dried sauces, pre-cooked sauces),
spices or spice preparations (e.g. mustard preparations, horseradish preparations),
seasoning mixtures as well as in particular seasonings which, for example, are applied in the field of snacks.

Preparations and semi-finished products according to the invention, serving for nutrition or enjoyment, which are reduced in or are free of sodium glutamate, are preferably selected from the group consisting of baked goods (e.g. bread, dry biscuits, cake, other pastries), drinks (e.g. vegetable juices, vegetable juice preparations), instant drinks (e.g. instant vegetable drinks), meat products (e.g. ham, fresh sausage or raw sausage preparations, spiced or marinated fresh or salt meat products), spiced or marinated fish products (e.g. Surimi), eggs or egg products (dried egg, egg white, egg yolk), cereal products (e.g. pre-cooked instant rice products, rice flour products, millet and sorghum products, raw or pre-cooked noodle and pasta products), milk products (e.g. cream cheese, soft cheese, hard cheese, milk drinks, whey, butter, products containing completely or partially hydrolysed milk protein), products made from soya protein and other fractions of soya beans (e.g. soya milk and products produced therefrom, preparations containing soya lecithin, fermented products such as tofu or tempeh or products produced therefrom, soya sauce), vegetable preparations (e.g. ketchup, sauces, dried vegetables, frozen vegetables, pre-cooked vegetables, vegetables picked in vinegar, vegetable concentrates or pastes, boiled vegetables, potato preparations), snack products (e.g. baked or fried potato crisps or potato dough products, bread dough products, extrudates based on corn, rice or peanuts), products based on fat and oil or emulsions of the same (e.g. mayonnaise, spreads, tartar sauce, dressings, seasoning preparations), other instant meals and soups (e.g. dried soups, instant soups, pre-cooked soups), sauces (instant sauces, dried sauces, pre-cooked sauces), spices or spice preparations (e.g. mustard preparations, horseradish preparations), seasoning mixtures as well as in particular seasonings which, for example, are applied in the field of snacks.

The preparations and semi-finished products according to the invention can also be present in the form of capsules, tablets (non-coated and coated tablets, for example coatings which are resistant to gastric juices), sugar-coated tablets, granulates, pellets, solid mixtures, dispersions in liquid phases, as emulsions, as powders, as solutions, as pastes or as other swallowable or chewable preparations, for example as dietary supplements.

The semi-finished products according to the invention serve, as a rule, for the production of preparations (according to the invention) which are ready for use or consumption, serving for nutrition or enjoyment.

In particular, semi-finished products according to the invention can serve for additive enhancement of the umami taste of food products and luxury foods which are reduced in sodium glutamate and also directly as seasoning for the industrial or non-industrial preparation of food products or luxury foods.

A semi-finished product (as is described above) is particularly preferred according to the invention which comprises, with regard to the total weight of the semi-finished product, a total quantity of sodium glutamate ranging from 0.00001 to 10% by weight, preferably 0.0001 to 5% by weight, particularly preferably from 0.001 to 2% by weight or no sodium glutamate.

Fundamentally, preferred preparations or semi-finished products according to the invention preferably contain:
- a total quantity of 1 ppm to 100,000 ppm, preferably 25 ppm to 1,000 ppm, in particular 5 ppm to 50 ppm of compounds of formula (I),
- or alternatively a proportion of 0.0001% by weight to 90% by weight, preferably 0.001% by weight to 30% by weight of an aromatic preparation according to the invention
- no sodium glutamate or a proportion of 0.00001 to 10% by weight, preferably 0.0001 to 5% by weight, in particular 0.001% by weight to 2% by weight of sodium glutamate, respectively with regard to the total weight of the preparations or of the semi-finished products.

The preparations or semi-finished products according to the invention are preferably produced in that the compounds of formula (I) are dissolved in or mixed into ethanol and if necessary demineralised and/or purified water. Subsequently, the solutions are converted into a (at least almost) solid form by a drying process, preferably a spray drying, vacuum freeze drying, reverse osmosis, vaporising or other concentration process or a combination of the processes referred to. Therein, the drying can occur with the aid of carriers (e.g. starch, starch derivatives, maltodextrin, silica gel, see above) or additives (e.g. plant gums, stabilisers). Preferably, the drying occurs by means of spray drying or vacuum freeze drying.

Preferred preparations or semi-finished products according to the invention are spices, seasoning mixtures, seasonings, stock cubes, instant soups, instant sauces, vegetarian instant meals, instant meals containing meat, fish sauces such as, for example, anchovy sauces, oyster sauces and soya sauces.

According to a further preferred embodiment, for the production of preparations or semi-finished products according to the invention, compounds of formula (I) as well as, if necessary, other components, are firstly incorporated into emulsions, into liposomes (e.g. originating from phosphatidylcholines) into microspheres, into nanospheres or also into capsules, granulates or extrudates made from a matrix suitable for foodstuffs and luxury foods (e.g. made from starch, starch derivatives, cellulose or cellulose derivatives such as hydroxypropyl cellulose, other polysaccharides such as alginate, natural fats, natural waxes such as bees wax or carnauba wax, or made from proteins such as gelatines).

In a further preferred production method, compounds of formula (I) are complexed with one or more suitable complexing agents, for example with cyclodextrins or cyclodextrin derivatives, preferably alpha or beta cyclodextrin, and are used in this complexed form.

Preparations or semi-finished products according to the invention are particularly preferred in which the matrix is selected such that the compounds of formula (I) are released from the matrix in a delayed manner, such that a prolonged effect is obtained. Here, for example, natural fats, natural waxes (e.g. bees wax, carnauba wax) or also natural dietary fibres (wheat fibres, apple fibres, yeast fibres, orange fibres) can be used as a matrix.

In connection with the present invention, also a method to impart, modify and/or enhance a umami, kokumi and/or salty taste of a preparation or semi-finished product which is ready for use or consumption, serving for nutrition or enjoyment, is described. Such a method comprises the step (a) mixing a umami-flavoured effective quantity (for preferred quantities see above), one or more compounds to be used according to the invention of formula (I) or a flavour mixture according to the invention (as is described above) or a plant extract according to the invention (as is described above) with one or more further components of the preparation or semi-finished product, or (b) applying a umami-flavoured effective quantity of one or more compounds of formula (I) or an aromatic blend according to the invention to one or more further components of the preparation or semi-finished product, or (c) embedding a flavoured effective quantity of one or more compounds of formula (I) or of an aromatic blend according to the invention in a coating or matrix material.

EXAMPLES

The following application examples serve for the clarification of the invention, without thus limiting this.

Production Example 1

Spray-Dried Composition 10 g of a cinnamic acid amide derivative of the following formula (II)

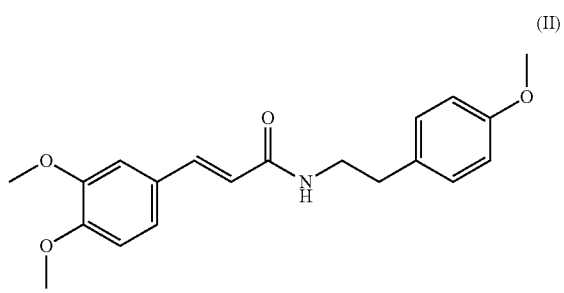

(II)

was mixed with 90 g maltodextrin, dissolved in 250 ml aqueous ethanol and then spray dried. The resulting powder was used in the application example described below. For this purpose, furthermore, an aromatic composition (not according to the invention) was used, which contained 0.025 g trans-pellitorine, 2.5 g hesperetin, 1.5 g phloretin and ad 100 g 1,2 propylene glycol.

Production Example 1

Seasoning

TABLE 1

Composition (all quantity information in g)

| Part | Component | I | II |
|---|---|---|---|
| A | Cinnamic acid amide according to formula (II) | 0.2 | 0.1 |
|  | Rubemamine/rubescenamine (1:1) |  | 0.1 |
|  | Sodium Chloride | 15 | 15 |
| B | Mustard flour | 5 | 5 |
|  | Mustard flavouring | 0.1 | 0.1 |

Production: Part A was weighed out. 290 ml water was provided, part A was added whilst stirring, and dissolved. The solution was thinned with water to 1.84 kg (pH 6.0) and subsequently freeze-dried (eutectic point: −15° C.; work vacuum: 0.52 mbar; storage space temperature: −5° C. to +25° C.). The product was then mixed with mustard flour and the mustard flavouring from part B and fabricated into a seasoning.

Application Example 2

Process Flavouring

TABLE 2

Composition (all quantity information in g)

| Ingredient | Usage [g] | | | |
|---|---|---|---|---|
|  | 2A | 2B | 2C | 2D |
| L-alanine | 41.0 | 41.0 | 41.0 | 41.0 |
| L-aspartic acid | 123.0 | 123.0 | 123.0 | 123.0 |
| Succinic acid | 4.7 | 4.7 | 4.7 | 4.7 |
| Calcium chloride dihydrate | 7.0 | 7.0 | 7.0 | 7.0 |
| L-cysteine•HCl monohydrate | 11.0 | 11.0 | 11.0 | 11.0 |
| Dipotassium phosphate | 6.0 | 6.0 | 6.0 | 6.0 |
| Powdered fructose | 1.0 | 1.0 | 1.0 | 1.0 |
| L-isoleucine | 1.6 | 1.6 | 1.6 | 1.6 |
| Potassium chloride | 228.0 | 228.0 | 228.0 | 228.0 |
| L-leucine | 1.6 | 1.6 | 1.6 | 1.6 |
| L-lysine•HCl | 3.6 | 3.6 | 3.6 | 3.6 |
| Magnesium chloride hexahydrate | 19.0 | 19.0 | 19.0 | 19.0 |
| Maltodextrin | 49.0 | 49.0 | 49.0 | 49.0 |

TABLE 2-continued

Composition (all quantity information in g)

| Ingredient | Usage [g] | | | |
|---|---|---|---|---|
|  | 2A | 2B | 2C | 2D |
| L-phenylalanine | 2.0 | 2.0 | 2.0 | 2.0 |
| L-proline | 74.0 | 74.0 | 74.0 | 74.0 |
| L-serine | 6.5 | 6.5 | 6.5 | 6.5 |
| L-threonine | 3.0 | 3.0 | 3.0 | 3.0 |
| L-valine | 9.0 | 9.0 | 9.0 | 9.0 |
| Cinnamic acid amide derivatives of formula (II) | 25.0 | 20.0 | 15.0 | 10.0 |
| Water | Ad 100 | | | |

Production: All components are mixed at 40° C. and subsequently heated at 85° C. for 10 minutes (reflux reaction). After cooling to 40° C., it is adjusted to pH 5 with potassium hydroxide solution.

Application Example 3

Instant Soup, Cream of Leek Type

Formulation A serves for comparison, formulations 3A, 3B and 3C are according to the invention (free of sodium glutamate), formulation 3D is free of sodium glutamate and reduced in salt.

TABLE 3

Composition (all quantity information in g)

| Component | A | 3A | 3B | 3C | 3D |
|---|---|---|---|---|---|
| Potato starch | 20.0 | 20.0 | 20.0 | 20.0 | 20.0 |
| Fat powder | 25.0 | 25.0 | 25.0 | 25.0 | 25.0 |
| Lactose | 20.0 | 20.0 | 20.0 | 20.0 | 20.0 |
| Maltodextrin | 11.730 | 14.714 | 14.710 | 14.680 | 15.705 |
| Table salt | 8.0 | 8.0 | 8.0 | 8.0 | 7.0 |
| Sodium glutamate | 3.0 | — | — | — | — |
| Spinach powder | 2.0 | 2.0 | 2.0 | 2.0 | 2.0 |
| Green leek powder | 2.0 | 2.0 | 2.0 | 2.0 | 2.0 |
| Citric acid, powdered | 0.3 | 0.3 | 0.3 | 0.3 | 0.3 |
| Hardened vegetable fat | 3.0 | 3.0 | 3.0 | 3.0 | 3.0 |
| Freeze-dried leek | 1.0 | 1.0 | 1.0 | 1.0 | 1.0 |
| Chicken flavouring | 1.0 | 1.0 | 1.0 | 1.0 | 1.0 |
| "Green leek" seasoning type, powder | 2.0 | 2.0 | 2.0 | 2.0 | 2.0 |
| "Fried onion" seasoning type | 0.6 | 0.6 | 0.6 | 0.6 | 0.6 |
| Yeast seasoning, "vegetable broth" type | 0.3 | 0.3 | 0.3 | 0.3 | 0.3 |
| Curcuma extract | 0.07 | 0.07 | 0.09 | 0.07 | 0.07 |
| Cinnamic acid amide derivative of formula (II) | — | 0.0025 | 0.0015 | 0.050 | 0.015 |

Production: 100 ml hot water is poured over 5 g of each powder mixture in order to obtain a soup which is ready for consumption.

Application Example 4

Instant Soup, Chicken Noodle Soup Type

Formulation A serves for comparison, formulations 4A, 4B and 4C are according to the invention (free of sodium glutamate), formulation 4D is free of sodium glutamate and reduced in salt.

TABLE 4

Composition (all quantity information in g)

| Component | A | 4A | 4B | 4C | 4D |
|---|---|---|---|---|---|
| Starch | 16.0 | 16.0 | 16.0 | 16.0 | 16.0 |
| Table salt | 7 | 7 | 7 | 7 | 5 |
| Sucrose, refined | 3.2 | 3.2 | 3.2 | 3.2 | 3.2 |
| Sodium glutamate | 3.2 | — | — | — | — |
| Sodium inosinate/ sodium guanylate in a ratio of 1:1 | 0.8 | 0.8 | 0.8 | 0.8 | 0.8 |
| Acid-hydrolysed vegetable protein | 8.0 | 8.0 | 8.0 | 8.0 | 8.0 |
| Fat powder | 2.0 | 2.0 | 2.0 | 2.0 | 2.0 |
| Vegetable fat, spray-dried | 1.0 | 1.0 | 1.0 | 1.0 | 1.0 |
| Freeze-dried chicken, diced | 2.0 | 2.0 | 2.0 | 2.0 | 2.0 |
| Soup noodles | 32.0 | 32.0 | 32.0 | 32.0 | 32.0 |
| Maltodextrin | 12.160 | 15.339 | 14.135 | 14.110 | 15.144 |
| Chinese vegetables, freeze-dried | 4.6 | 4.6 | 4.6 | 4.6 | 4.6 |
| Chicken flavouring | 8.0 | 8.0 | 8.0 | 8.0 | 8.0 |
| Foodstuff colouring, riboflavin | 0.04 | 0.04 | 0.04 | 0.04 | 0.04 |
| Cinnamic acid amide derivative of formula (II) | — | 0.0025 | 0.025 | 0.05 | 0.015 |
| Aromatic composition according to production example 1-I | — | — | 1.2 | 1.2 | 1.2 |

Production: 4.6 g of each powder mixture is boiled in 100 ml water for 10 minutes in order to obtain a soup which is read for consumption.

Application Example 5

Seasoning Mixture, Pepper Type

Formulation A serves for comparison, formulations 5A, 5B and 5C are according to the invention (free of sodium glutamate), formulation 5D is free of sodium glutamate and reduced in salt.

TABLE 5

Composition (all quantity information in g)

| Component | A | 5A | 5B | 5C | 5D |
|---|---|---|---|---|---|
| Milk protein | 0.8 | 0.8 | 0.8 | 0.8 | 0.8 |
| Carob gum | 2.0 | 2.0 | 2.0 | 2.0 | 2.0 |
| Corn starch | 21.997 | 27.995 | 27.865 | 27.340 | 29.900 |
| Table salt | 14.0 | 14.0 | 14.0 | 14.0 | 12.0 |
| Paprika powder | 13.0 | 13.0 | 13.0 | 13.0 | 13.0 |
| Tomato powder | 13.0 | 13.0 | 13.0 | 13.0 | 13.0 |
| Sucrose | 4.0 | 4.0 | 4.0 | 4.0 | 4.0 |
| Garlic powder | 0.5 | 0.5 | 0.5 | 0.5 | 0.5 |
| Hardened vegetable fat | 8.0 | 8.0 | 8.0 | 8.0 | 8.0 |
| Fat powder | 110 | 11.0 | 11.0 | 11.0 | 11.0 |
| Sodium glutamate | 6.0 | — | — | — | — |
| Beetroot and paprika food colouring | 2.0 | 2.0 | 2.0 | 2.0 | 2.0 |
| "Pepper" type flavouring | 2.0 | 2.0 | 2.0 | 2.0 | 2.0 |
| "Pizza" type flavouring | 1.2 | 1.2 | 1.2 | 1.2 | 1.2 |
| "Tomato" type flavouring | 0.4 | 0.4 | 0.4 | 0.4 | 0.4 |
| Black pepper extract | 0.1 | 0.1 | 0.1 | 0.1 | 0.1 |
| Cinnamic acid amide derivative according to formula II | 0.003 | 0.005 | 0.1 | 0.060 | 0.10 |

Production: Each 100 g pork neck steak is sprinkled evenly with 1.7 g of preparations A, B, C and D, and fried.

Application Example 6

Tomato Ketchup

Formulations A and B serve for comparison, formulations 6A (free of sodium glutamate, reduced in sugar) and 6B (reduced in salt and sugar; free of sodium glutamate) are according to the invention.

TABLE 6

Composition (all quantity information in g)

| Component | A | B | 6A | 6B |
|---|---|---|---|---|
| Sodium glutamate | 0.40 g | — | — | — |
| Table salt | 2 g | 1 g | 2 g | 1 g |
| Starch, Farinex WM 55 | 1 g | 1 g | 1 g | 1 g |
| Sucrose | 12 g | 9.2 g | 9.2 g | 9.2 g |
| Double strength tomato concentrate | 40 g | 40 g | 40 g | 40 g |
| Glucose syrup 80 Brix | 18 g | 18 g | 18 g | 18 g |
| Brandy vinegar 10% | 7 g | 7 g | 7 g | 7 g |
| Water | 19.60 g | 23.80 g | 22.30 g | 23.25 g |
| Aromatic composition according to production example 1-II | — | — | 0.4 g | 0.4 g |
| 5% solution of the cinnamic acid amide derivative according to formula II in propylene glycol | — | — | 0.10 g | 0.15 g |

Production: The ingredients are mixed in the specified order and the produced ketchup is homogenised with the aid of a mixer, filled into glasses and sterilised.

Application Example 7

Stock

Formulations A and B serve for comparison, formulations 7A, 7B (free of sodium glutamate) and 7C (reduced in salt, free of sodium glutamate) are according to the invention.

TABLE 7

Composition (all quantity information in g)

| Component | A | B | 7A | 7B | 7C |
|---|---|---|---|---|---|
| Fat powder | 8.77 | 8.77 | 8.77 | 8.77 | 8.77 |
| Sodium glutamate | 8.77 | 5 | 5 | — | — |
| Yeast extract powder | 12.28 | 12.28 | 12.28 | 12.28 | 12.28 |
| Table salt | 29.83 | 29.83 | 29.83 | 29.83 | 26.83 |
| Maltodextrin | 37.28 | 41.050 | 41.040 | 45.090 | 48.950 |
| Natural vegetable extract | 3.07 | 3.07 | 3.07 | 3.07 | 3.07 |
| Cinnamic acid amide derivative according to formula II | — | — | 0.010 | 0.030 | 0.100 |

Production: 1000 ml hot water is poured over 15 g of each powder mixture.

Application Example 8

Seasoning Mixture for Potato Crisps

Formulations A and B serve for comparison, formulations 8A (reduced in sodium glutamate), 8B (free of sodium glutamate) and 8C (reduced in salt, free of sodium glutamate) are according to the invention.

TABLE 8

Composition (all quantity information in g)

| Component | A | B | 8A | 8B | 8C |
|---|---|---|---|---|---|
| Sodium glutamate | 3.50 | 2.00 | 2.00 | — | 1.00 |
| Cheese powder | 10.00 | 10.00 | 10.00 | 10.00 | 10.00 |
| Garlic powder | 2.00 | 2.00 | 2.00 | 2.00 | 2.00 |
| Whey powder | 38.86 | 40.36 | 40.06 | 41.91 | 44.76 |
| Seasoning oil extract | 0.20 | 0.20 | 0.20 | 0.20 | 0.20 |
| Paprika powder | 9.80 | 9.80 | 9.80 | 9.80 | 9.80 |
| Table salt | 21.00 | 21.00 | 21.00 | 21.00 | 17.00 |
| Tomato powder | 9.00 | 9.00 | 9.00 | 9.00 | 9.00 |
| Dry flavouring | 2.50 | 2.50 | 2.50 | 2.50 | 2.50 |
| Silicon dioxide | 0.02 | 0.02 | 0.02 | 0.02 | 0.02 |
| Vegetable oil | 0.02 | 0.02 | 0.02 | 0.02 | 0.02 |
| Onion powder | 3.00 | 3.00 | 3.00 | 3.00 | 3.00 |
| Cream flavouring concentrate | 0.03 | 0.03 | 0.03 | 0.03 | 0.03 |
| Cheese flavouring | 0.03 | 0.03 | 0.03 | 0.03 | 0.03 |
| Tomato flavouring concentrate | 0.04 | 0.04 | 0.04 | 0.04 | 0.04 |
| Spray-dried composition according to production example 1-I | — | — | 0.30 | 0.45 | 0.60 |

Production: 6 g of the seasoning mixture is spread over 94 g potato crisps.

Application Example 9

White Sauce

Formulations A and B serve for comparison, formulations 9A (reduced in sodium glutamate), 9B (free of sodium glutamate) and 9C (reduced in salt; free of sodium glutamate) are according to the invention.

TABLE 9

Composition (all quantity information in g)

| Component | A | B | 9A | 9B | 9C |
|---|---|---|---|---|---|
| Maltodextrin | 25.98 | 27.18 | 27.08 | 27.58 | 28.43 |
| Table salt | 7.50 | 7.50 | 7.50 | 7.50 | 6.00 |
| Sodium glutamate | 2.00 | 0.80 | 0.80 | — | 0.80 |
| Vegetable fat | 5.00 | 5.00 | 5.00 | 5.00 | 5.00 |
| Pepper, white | 0.02 | 0.02 | 0.02 | 0.02 | 0.02 |
| Onion powder | 1.50 | 1.50 | 1.50 | 1.50 | 1.50 |
| Pregelatinised corn starch | 30.00 | 30.00 | 30.00 | 30.00 | 30.00 |
| Fat powder | 28.00 | 28.00 | 28.00 | 28.00 | 28.00 |
| Spray-dried composition according to production example 1-II | — | — | 0.10 | 0.40 | 0.25 |

Production: 1000 ml hot water is poured over 90 g of the sauce mixture and stirred vigorously with a whisk.

Application Example 10

Brown Sauce

Formulations A and B serve for comparison, formulations 10A (reduced in sodium glutamate), 10B (free of sodium glutamate) and 10C (reduced in salt; free of sodium glutamate) are according to the invention.

TABLE 10

Components (all quantity information in g)

| Component | A | B | 10A | 10B | 10C |
|---|---|---|---|---|---|
| Starch | 40.00 | 40.00 | 40.00 | 40.00 | 40.00 |
| Maltodextrin | 33.10 | 33.80 | 33.66 | 34.70 | 35.07 |
| Table salt | 6.00 | 6.00 | 6.00 | 6.00 | 4.50 |
| Caramel, spray-dried | 5.00 | 5.00 | 5.00 | 5.00 | 5.00 |
| Yeast extract powder | 3.00 | 3.00 | 3.00 | 3.00 | 3.00 |
| Sodium glutamate | 2.00 | 1.30 | 1.30 | — | 1.30 |
| Sugar | 0.50 | 0.50 | 0.50 | 0.50 | 0.50 |
| Fat powder | 5.00 | 5.00 | 5.00 | 5.00 | 5.00 |
| Tomato powder | 3.00 | 3.00 | 3.00 | 3.00 | 3.00 |
| Natural vegetable extract | 1.00 | 1.00 | 1.00 | 1.00 | 1.00 |
| Onion extract | 0.30 | 0.30 | 0.30 | 0.30 | 0.30 |
| Pepper extract | 0.10 | 0.10 | 0.10 | 0.10 | 0.10 |
| Dry flavouring | 1.00 | 1.00 | 1.00 | 1.00 | 1.00 |
| Spray-dried composition according to production example 1-I | — | — | 0.70 | 2.00 | 0.70 |

Production: 1000 ml of hot water is poured over 90 g of sauce mixture and stirred vigorously with a whisk.

Application Example 11

Tomato Soup

Formulations A and B serve for comparison, formulations 11A (reduced in sodium glutamate), 11B (free of sodium glutamate) and 11C (reduced in salt; free of sodium glutamate) are according to the invention.

TABLE 10

Composition (all quantity information in g)

| Component | A | B | C | D | E |
|---|---|---|---|---|---|
| Water | 50.65 | 50.80 | 50.799 | 51.035 | 51.29 |
| Vegetable oil | 5.50 | 5.50 | 5.50 | 5.50 | 5.50 |
| Tomato paste | 24.00 | 24.00 | 24.00 | 24.00 | 24.00 |
| Cream | 1.05 | 1.05 | 1.05 | 1.05 | 1.05 |
| Sugar | 2.00 | 2.00 | 2.00 | 2.00 | 2.00 |
| Table salt | 1.70 | 1.70 | 1.70 | 1.70 | 1.20 |
| Sodium glutamate | 0.40 | 0.25 | 0.25 | — | 0.25 |
| Wheat flour | 5.50 | 5.50 | 5.50 | 5.50 | 5.50 |
| Starch | 1.20 | 1.20 | 1.20 | 1.20 | 1.20 |
| Diced tomatoes | 8.00 | 8.00 | 8.00 | 8.00 | 8.00 |
| Spray-dried composition according to production example 1-II | — | — | 0.001 | 0.015 | 0.010 |

Production: The solid components are weighed out, mixed and added to the water. The vegetable oil is added and the tomato paste is added. The mixture is brought to the boil whilst stirring.

Application Example 11

Application in a Green Tea Drink

TABLE 11

Composition (all quantity information in % by weight)

| Ingredient | 11A | 11B |
|---|---|---|
| Green tea concentrate | 18.00 | 18.00 |
| 5% solution of cinnamic acid amide derivative of formula (II) in propylene glycol | 0.002 | 0.004 |
| Demineralised water | 81.998 | 81.996 |

Production: The green tea concentrate is mixed with each 5% solution of the cinnamic acid amide derivative of formula (II) to be used according to the invention. Subsequently, it is topped up with demineralised water and is mixed thoroughly again. Then the product is filtered, packaged to be ready for consumption and sterilised at 118° C.

Application Example 12

Meat Seasoning Mixture for (Instant Noodles)

TABLE 12

Composition (all quantity information in % by weight)

| Ingredient | 12 |
|---|---|
| Beef dripping flavouring | 5.00 |
| Caramel | 3.00 |
| Citric acid (anhydrous) | 0.40 |
| Chives (drained) | 2.00 |
| Maltodextrin (from tapioca) | 10.30 |
| Monosodium glutamate | 15.00 |
| Onion powder | 5.00 |
| Ribotide | 0.80 |
| Sodium chloride | 45.65 |
| Sugar | 2.80 |
| Sweet whey powder | 6.50 |
| 10% solution of the cinnamic acid amide derivative according to formula II in propylene glycol | 0.05 |

Production: All contents are mixed until a homogenous mixture results.

Application Example 13

Noodles

TABLE 13

Composition (all quantity information in % by weight)

| Part | Ingredient | 13 |
|---|---|---|
| A | Wheat four | 62.00 |
| | Potato starch | 10.90 |
| B | Salt | 1.10 |
| | Guar gum | 0.06 |
| | Sodium carbonate | 0.07 |
| | Potassium carbonate | 0.25 |
| | $Na_2H_2P_2O_7$ | 0.07 |
| | 10% solution of cinnamic acid amide derivative according to formula II in propylene glycol | 0.05 |
| C | Water | 25.45 |

Production: A suspension of the ingredients B in water is added to a mixture of the ingredients A and kneaded into a dough. After the dough has rested for approx. 5 minutes, this is processed into sheets with the aid of a pasta machine, which are trimmed into a usual shape in a final work step. The noodles are ready for consumption after a cooking time of 3 minutes and can be served for example with 8 g of the meat seasoning mixture (application example 12).

The invention claimed is:

1. A flavouring mixture comprising:
   (a) a combination of a compound of formula (II)

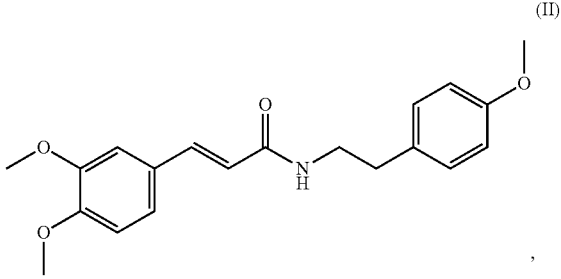

and at least one of rubemamine and rubescenamine, wherein the ratio of the compound of Formula (II) to the at least one of rubemamine and rubescenamine is about 10:90 to about 90:10.

2. The flavouring mixture of claim 1 further comprising:
   (b) at least one further flavouring agent.

3. The flavouring mixture of claim 2, wherein component (b) by itself imparts a taste impression of umami, kokumi or salty, or enhances the taste impression "sweet".

4. The flavouring mixture according to claim 2, wherein the one or more flavouring agents of (b) is selected from the group consisting of monosodium glutamate, free glutamic acid, a nucleotide or a pharmaceutically acceptable salt thereof, a strombine, a theogallin, a pyridine betain compound, a glutamic acid glycoside, a malic acid glycoside, a glutathione derivative, a lactisole or alkylpyridine, hesperetin, 3,7-dihydroxy-4'-methoxyflavane, phloretin, or a mixture thereof.

5. The flavouring mixture according to claim 2, wherein the total quantity of the combination of (a), with regard to the total weight of the flavouring preparation, is 0.0001 to 95% by weight.

6. A preparation for oral ingestion comprising:
   (a) a combination of a compound of formula (II)

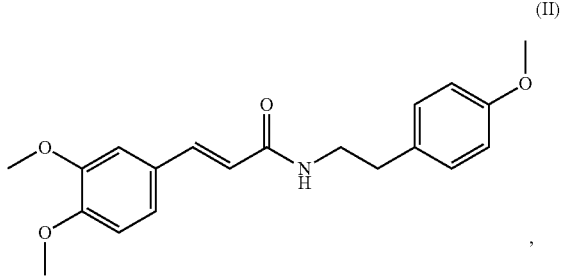

and at least one of rubemamine and rubescenamine, wherein the ratio of the compound of Formula (II) to the at least one of rubemamine and the rubescenamine is about 10:90 to about 90:10; and (b) at least one further component suitable for consumption, selected from the group consisting of a carrier, an aromatic substance, a fat or oil, an emulsifier, and an antioxidant.

7. A preparation according to claim 6 that is ready for use or consumption, is a serving for nutrition or enjoyment, or is a semi-finished product.

8. A preparation according to claim 6 that is a baked good, a drink, an instant drink, a meat product, a seasoned or marinated fish product, an egg or an egg product, a cereal product, a milk product, a product made from soya protein or other soya bean fraction, a vegetable preparation, a snack item, a product based on fat and oil or an emulsion of the same, an instant meal, a soup, a sauce, a spice, a spice preparation, or a seasoning.

9. The preparation according to claim 6, wherein the total quantity of the combination of (a), with regard to the total weight of the flavouring preparation, is 5 to 100,000 ppm.

10. The preparation according to claim 6, wherein the total quantity of the combination of (a), with regard to the total weight of the preparation, is 15 to 500 ppm.

11. The preparation according to claim 6, characterised in that it has a reduced content of sodium glutamate or is completely free thereof.

12. The preparation according to claim 6, characterised in that it has a reduced content of sugar and/or salt or is completely free thereof.

13. A method for flavouring a preparation or semi-finished product comprising adding to the preparation a flavouring mixture according to claim 1.

14. The method according to claim 13, wherein the flavouring mixture imparts a taste impression of umami, kokumi or salty, or enhances the taste impression "sweet".

15. The method according to claim 13, wherein the flavouring mixture is added to the preparation or semi-finished product, with regard to the total weight of the preparation or semi-finished product, in an amount of 5 to 100,000 ppm.

16. The preparation according to claim 13, wherein the flavouring mixture is added to the preparation or semi-finished product, with regard to the total weight of the preparation or semi-finished product, in an amount of 15 to 500 ppm.

* * * * *